United States Patent Office
3,637,632
Patented Jan. 25, 1972

3,637,632
SHORTSTOPPING FREE RADICAL POLYMERIZA-
TION OF VINYLIDENE MONOMERS
Lee Traynor, Akron, Ohio, assignor to The B. F.
Goodrich Company, New York, N.Y.
No Drawing. Filed June 1, 1970, Ser. No. 42,571
Int. Cl. C08f 1/82, 3/30
U.S. Cl. 260—92.8 A                        10 Claims

ABSTRACT OF THE DISCLOSURE

The free radical polymerization of vinylidene monomers is effectively terminated by adding to a polymerization mixture thiosemicarbazide or thiosemicarbazone derivatives thereof. These short-stops are particularly effective in the polymerization of vinyl halides with organic peroxy catalysts and result in stable uniform polymers.

BACKGROUND OF THE INVENTION

In the polymerization of vinylidene monomers with free radical catalysts, particularly those containing oxygen, after the polymerization reaches a desired state it is generally necessary to stop the reaction in order to obtain stable uniform polymers. In many polymerization systems it is desirable to stop the polymerization reaction at less than complete conversion so that an effective short-stop must be employed to stop the polymerization reaction but not adversely affect the polymerization product. This problem is particularly acute with the more active catalysts that give extremely fast polymerization rates and with, for example, vinyl chloride polymers that are subject to thermal degradation.

U.S. Pat. 3,344,144 discloses the use of certain thiosemicarbazones as stabilizers for unsaturated monomers, particularly vinyl monomers. The amounts disclosed for this use are from 0.5 to 2000 parts per million. This reference teaches that these stabilizers for vinyl monomers produce no adverse effects with monomers containing the thiosemicarbazone stabilizers when subjected to polymerization in the presence of peroxide or redox catalysts. I have now found quite unexpectedly that when thiosemicarbazones are added to a polymerization mixture of a vinylidene monomer, as vinyl chloride, and a free radical catalyst, as a peroxy catalyst, that the thiosemicarbazones immediately and effectively stop the polymerization reaction and results in uniform properties in the polymerization products that have good long term thermal stability, even when the polymerization is carried only to conversions of less than 100% of monomers to polymer.

SUMMARY OF THE INVENTION

The polymerization of vinylidene monomers having a terminal $CH_2<$ grouping with free radical catalysts, particularly oxygen-containing catalysts, is effectively stopped by the addition thereto of thiosemicarbazide or a thiosemicarbazone derivative thereof having the formula

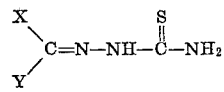

wherein X and Y may be hydrogen, alkyl containing from 1 to 12 carbon atoms, cycloalkyl containing 3 to 12 carbon atoms, aryl containing 6 to 12 carbon atoms and —SR or —OR wherein R is alkyl or aromatic containing 1 to 12 carbon atoms.

DETAILED DESCRIPTION

The process of this invention is applicable to any free radical polymerization system normally used to polymerize vinylidene monomers including, for example, bulk, solution, aqueous suspension, aqueous emulsion, batch or continuous and the like, as is well known to those skilled in the art.

The monomers contemplated in the process of the invention include any vinylidene monomer having at least one terminal $CH_2<$ grouping, including particularly the vinyl halides, as vinyl chloride and vinylidene chloride; esters of acrylic acid including ethyl acrylate, butyl acrylate, octyl acrylate, cyanoethyl acrylate; esters of methacrylic acid including methyl methacrylate, butyl methacrylate; nitriles including acrylonitrile and methacrylonitrile; acrylamides including methyl acrylamide, N-methylol acrylamide, N-butoxy methacrylamide; vinyl esters including ethyl vinyl ether, chloroethyl vinyl ether; the vinyl ketones; styrene and styrene derivatives including α-methyl styrene, vinyl toluene, chlorostyrene, vinyl naphthalene, allyl and vinyl chloroacetate, vinyl acetate, vinyl pyridine, methylvinyl ketone; di-olefins including butadiene, isoprene, chloroprene and the like and mixtures of any of these types of monomers and other vinylidene monomers copolymerizable therewith including esters of maleic and fumaric acid and the like; and other vinylidene monomers of the types known to those skilled in the art that are polymerized with oxygen-containing free radical catalysts. The invention is particularly applicable to the polymerization of vinyl chloride alone or with one or more other vinylidene monomers copolymerizable therewith in amounts as great as about 80% of the monomer mixture.

The catalysts or initiators that the process of this invention is applied to include free radical catalysts, particularly those containing oxygen as the peroxy type. These include, for example, potassium persulfate, ammonium persulfate, sodium persulfate, benzoyl peroxide, lauryl peroxide, caprylyl peroxide, cumene hydroperoxide, diisobutyl benzenehydroperoxide, diisobutylperoxydicarbonate, pelargonyl peroxide, t-butyl peroxypivolate, acetyl cyclohexane sulfonylperoxide, t-butyl benzoate and the like, including the well known redox systems containing such peroxy catalysts.

The method of the invention is particularly applicable to those more active catalysts, for example, acyl persulfonates having the structural formula $$RSO_2—O—O—COR'$$

wherein R is alkyl or cycloalkyl and R' is primary, secondary and tertiary alkyl radicals, containing 1 to 12 carbon atoms, and alkyl peroxycarbonates, as described in 2,464,062, particularly dialkyl peroxydicarbonates, and mixtures of catalysts containing at least one of these and other organic free radical peroxy type catalysts. The amounts of such catalysts normally will be from greater than about 0.001 part per 100 parts of monomer depending, as is known, upon the monomer and the temperature and generally will be an amount greater than 0.01 part and less than one part.

The thiosemicarbazone short-stops have the general formula

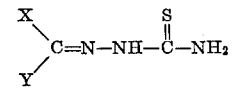

wherein X and Y may be hydrogen, alkyl containing from 1 to 12 carbon atoms, cycloalkyl containing 3 to 12 carbon atoms, aryl containing 6 to 12 carbon atoms and —SR or —OR wherein R is alkyl, cycloalkyl or aromatic radicals containing 1 to 12 carbon atoms. X and Y may be the same or different.

The amount of thiosemicarbazide or thiosemicarbazone used normally will be greater than 1/10 the amount of catalyst charged, usually as a molar amount about equivalent to the catalyst remaining in the polymerization mixture at the selected short-stop conversion. Usually about 0.01 part per 100 of monomers will be used, as 0.01 to 1, up to an excess of that required to stop the polymerization, which is readily determined by those skilled in the art. A substantial excess normally is not necessary. One can readily determine the amount for any polymerization recipe to completely stop the reaction at any desired point. The thiosemicarbazone may be added to the polymerization mixture as such or in solution.

The thiosemicarbazones are readily prepared, for example, from a carbonyl compound and thiosemicarbazide as described by Sah, P. T. and T. C. Daniels, Rec. Trav. Chim. 69, 1545–56 (1950) and Wilson, F. J. and R. Burns, J. Chem. Soc., 121, 870 (1922). Carbonyls used to form the thiosemicarbazones include ketones and aldehydes such as benzaldehyde, p-hydroxybenzaldehyde, anisaldehyde, acetone, tolualdehyde, veratraldehyde, diamyl ketone, salicylaldehyde, cinnamaldehyde, vanillin, acetaldehyde, heptaldehyde, acetophenone, propiophenone, hexanone, isophorone, piperonal, methylethyl ketone and the like. Particularly useful short-stops include acetone thiosemicarbazone, p-hydroxybenzaldehyde thiosemicarbazone and vanillin thiosemicarbazone for short-stopping the polymerization of vinyl chloride with, for example, diisopropyl peroxydicarbonate and acetylcyclohexyl sulfonylperoxide at conversions between about 25 and 95° C. even at conversion of monomer to polymer as low as 50% or lower.

A series of polymerizations to demonstrate the method of the invention were conducted in a 2 quart sealed polymerization vessel immersed in a 50° C. bath. The recipe used was 100 parts vinyl chloride, 400 parts water, 0.75 part of diisopropyl peroxydicarbonate (1.74 millimols), 86–89% hydrolyzed polyvinyl acetate (polyvinyl alcohol) 0.15. The short-stop was injected into the polymerization mixture in amounts equimolar to diisopropyl peroxydicarbonate charged except in Run 2, 2.5 millimols and in Run 5, 0.9 millimol at predetermined conversions, and the conversion followed for 2 to 6 hours thereafter. The conversion rate per hour just prior to and after injection is shown in the tables as R and $R_s$. Normally, unreacted vinyl chloride is removed after short-stopping but was allowed to remain in these mixtures to show the effectiveness of the short-stops. R is the rate in percent of conversion of monomer per hour at short-stopping. $R_s$ is the rate after short-stopping.

TABLE I

| Run | Thiosemicarbazone of— | Parts per 100 parts VCl | Conversion at injection, percent | R/hour, percent | $R_s$/hour, percent |
|---|---|---|---|---|---|
| 1 | Benzaldehyde | 0.069 | 64.7 | 22.7 | 0 |
| 2 | p-Hydroxybenzaldehyde | 0.075 | 65.4 | 22.8 | 0 |
| 3 | Acetone | 0.049 | 59.0 | 22.1 | <0.1 |
| 4 | Salicylaldehyde | 0.109 | 63.0 | 20.5 | 0 |
| 5 | Cinnamaldehyde | 0.036 | 58.4 | 21.9 | 0.2 |
| 6 | Vanillin | 0.08 | 57.0 | 21.1 | 0.1 |
| 7 | Isophorone | 0.075 | 58.3 | 19.3 | 0.1 |
| 8 | Piperonal | 0.079 | 64.0 | 23.5 | 0.1 |
| 9 | thiosemicarbazide | 0.032 | 60.0 | 22.0 | <0.8 |

To demonstrate the effectiveness of these thiosemicarbazone short-stops with other initiating systems, a series of runs were made following the procedure described above with vinyl chloride, with the exception that with sodium persulfate, 0.4 part of sodium laurate was used in place of hydrolyzed polyvinyl acetate and 0.16 part of $K_3PO_4$. In the table below are set forth the initiator and short-stop and amounts used.

TABLE II

| Run | Initiator | Milli-mols | Parts Initiator/100 VCl | Shortstop | Milli-mols | Parts/100 VCl | Percent Conversion at injection | Rate/hour | $R_s$/hour |
|---|---|---|---|---|---|---|---|---|---|
| 1 | Caprylyl peroxide | 1.4 | 0.080 | Acetone thiosemicarbazone | 1.4 | 0.037 | 48 | 4.1 | 0.3 |
| 2 | Sodium persulfate | 2.77 | 0.13 | do | 2.77 | 0.073 | 55 | 19.2 | 0.05 |
| 3 | Acetylcyclohexyl sulfonyl peroxide | 0.9 | 0.042 | do | 0.928 | 0.024 | 23 | 13.3 | 0 |
| 4 | do | 0.9 | 0.042 | p-Hydroxybenzaldehyde thiosemicarbazone | 0.928 | 0.036 | 28 | 15 | 0 |

Some short-stops for vinyl chloride polymerization that might be otherwise effective are unsatisfactory because the resulting polymerization products often are discolored or do not have long term thermal stability.

A particular sensitive test for this long term stability is to add tin stabilizers to the reaction products and then heat the resulting compounds at 180° C. to determine the rate of discoloration. Compounds were prepared by mixing together, in parts by weight, 100 polyvinyl chloride, 1 calcium stearate and 0.8 dibutyl-Sn-s,s′-bis(octyl thioglycollate). The polyvinyl chloride short-stopped with the thiosemicarbazones showed excellent resistance to discoloration on oven aging. Vinyl chloride polymers short-stopped with thiosemicarbazones have excellent long term thermal stability.

When polyvinyl chloride short-stopped with the thiosemicarbazones was compounded with 10 parts of basic lead carbonate or 5 parts tribasic lead sulfate, 4–7 parts of calcined clay and 44–52 parts dioctyl phthalate dry mixed and then milled at 270° F. and molded at 350° F., the resulting sheet material showed no discoloration often associated with polyvinyl chloride stabilized with basic lead stabilizers.

The process of the invention is also found to be effective in the peroxy catalyzed polymerization of vinylidene chloride, vinyl acetate, acrylonitrile, styrene, alkyl acrylates and methacrylates, butadiene and mixtures of such monomers.

For example, styrene was polymerized to a recipe of 100 weight parts styrene, 400 weight parts water, 1 weight part S.F. soap flakes and 0.13 weight part sodium persulfate at 50° C. When conversion reached 22%, at a rate of 6.6% per hour, 0.072 weight part of acetone thiosemicarbazone was injected. After the injection, the polymerization rate was 0% per hour.

In another demonstration of the effectiveness of this short-stop system, butadiene and styrene were copolymerized together to a recipe of 75 weight parts butadiene-1,3, 25 weight parts styrene, 400 weight parts water, 5 weight parts S.F. soap flakes, 0.5 weight part lauryl mercaptan and 0.26 weight part sodium persulfate, at 55° C. At a conversion of 31.4%, and a rate of 8.3% per hour, 0.14 weight part of acetone thiosemicarbazone was injected. The rate after the injection and before the monomers were removed was less than 0.4% per hour.

I claim:

1. The method of stopping peroxy-catalyzed free radical polymerization of vinylidene monomers comprising adding to a mixture containting vinylidene monomer and peroxy catalyst a thiosemicarbazone having the formula

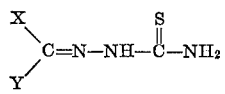

wherein X and Y are hydrogen, alkyl radicals containing from 1 to 12 carbon atoms, cycloalkyl radicals containing from 3 to 12 carbon atoms, aryl radicals containing 6 to 12 carbon atoms and —SR or —OR wherein R is an alkyl or aryl radical containing from 1 to 12 carbon atoms or a cycloalkyl radical containing 3 to 12 carbon atoms, or thiosemicarbazide.

2. The method of claim 1 wherein the thiosemicarbazone is acetone thiosemicarbazone.

3. The method of claim 1 wherein the thiosemicarbazone is p-hydroxybenzaldehyde thiosemicarbazone.

4. The method of claim 1 wherein the thiosemicarbazone is vanillin thiosemicarbazone.

5. The method of claim 1 wherein the vinylidene monomer is a vinyl halide.

6. The method of claim 5 wherein the vinyl halide is vinyl chloride and the peroxy catalyst is an acyl persulfonate or an alkyl peroxycarbonate.

7. The method of claim 6 wherein the thiosemicarbazone is acetone thiosemicarbazone.

8. The method of claim 6 wherein the thiosemicarbazone is p-hydroxybenzaldehyde thiosemicarbazone.

9. The method of claim 6 wherein the thiosemicarbazone is vanillin thiosemicarbazone.

10. The method of claim 7 wherein the catalyst is acetyl cyclohexylsulfonylperoxide or diisopropyl peroxydicarbonate.

References Cited

UNITED STATES PATENTS

| | | | |
|---|---|---|---|
| 3,274,231 | 9/1966 | Tadahiro | 260—290 |
| 3,344,144 | 9/1967 | Tadahiro | 260—290 |

JOSEPH L. SCHOFER, Primary Examiner

J. A. DONAHUE, Jr., Assistant Examiner

U.S. Cl. X.R.

260—63, 78.5, 85.7, 86.1, 86.3, 86.7, 87.1, 87.3, 87.5, 87.7, 88.3, 88.7, 89.1, 89.5, 91.1, 91.5, 91.7, 92.3, 93.5, 94.2